(12) United States Patent
Bengtsson et al.

(10) Patent No.: US 11,463,151 B2
(45) Date of Patent: Oct. 4, 2022

(54) OPERATING DEVICES IN A WIRELESS COMMUNICATION SYSTEM

(71) Applicant: Sony Corporation, Tokyo (JP)

(72) Inventors: Erik Bengtsson, Eslöv (SE); Fredrik Rusek, Eslöv (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/264,072

(22) PCT Filed: Jul. 30, 2018

(86) PCT No.: PCT/EP2018/070597
§ 371 (c)(1),
(2) Date: Jan. 28, 2021

(87) PCT Pub. No.: WO2020/025099
PCT Pub. Date: Feb. 6, 2020

(65) Prior Publication Data
US 2021/0184755 A1    Jun. 17, 2021

(51) Int. Cl.
*H04B 7/10* (2017.01)
*H04B 17/345* (2015.01)
*H04B 17/382* (2015.01)

(52) U.S. Cl.
CPC ............. *H04B 7/10* (2013.01); *H04B 17/345* (2015.01); *H04B 17/382* (2015.01)

(58) Field of Classification Search
CPC ....... H04B 7/10; H04B 17/345; H04B 17/382
See application file for complete search history.

(56) References Cited

U.S. PATENT DOCUMENTS 10,673,512 B2 * 6/2020 Athley ................ H04B 7/0617
2016/0365900 A1 12/2016 Kim
(Continued)

FOREIGN PATENT DOCUMENTS

EP      3349367 A1    7/2018
JP      2003520545 A  7/2003
(Continued)

OTHER PUBLICATIONS

International Search Report and Written Opinion from corresponding International Application No. PCT/EP2018/070597, dated Mar. 25, 2019, 12 pages.

*Primary Examiner* — Janice N Tieu
(74) *Attorney, Agent, or Firm* — Tucker Ellis LLP (57) ABSTRACT

The present application relates to methods for operating a wireless communication device (20). According to an embodiment, the method comprises transmitting, on a wireless link between the wireless communication device (20) and a further wireless communication device (30, 40, 50), at least one first signal (301) using a first polarization (501), transmitting, on the wireless link, at least one second signal (302) using a second polarization (502), and transmitting, on the wireless link, at least one third signal (303) using a third polarization (503). The first polarization (501), the second polarization (502), and the third polarization (503) are different from each other. Based on the at least one first signal (301), the at least one second signal (302), and the at least one third signal (303), channels of the wireless link associated with the at least one first signal (301), the at least one second signal (302), and the at least one third signal (303) are sounded.

13 Claims, 5 Drawing Sheets

(56) References Cited

U.S. PATENT DOCUMENTS

| | | |
|---|---|---|
| 2018/0035392 A1 | 2/2018 | Patel |
| 2019/0097328 A1* | 3/2019 | Yong .................... H01Q 21/245 |
| 2020/0008260 A1* | 1/2020 | Islam ................... H04B 17/309 |
| 2021/0091869 A1* | 3/2021 | Han ..................... H04L 45/122 |

FOREIGN PATENT DOCUMENTS

| | | |
|---|---|---|
| JP | 2019506808 A | 3/2019 |
| JP | 2020504473 A | 2/2020 |
| WO | 2015068284 A1 | 5/2015 |
| WO | 2016114696 A1 | 7/2016 |
| WO | 2017136732 A1 | 8/2017 |
| WO | 2017157450 A1 | 9/2017 |
| WO | 2018085638 A1 | 5/2018 |

* cited by examiner

OPERATING DEVICES IN A WIRELESS COMMUNICATION SYSTEM

FIELD OF THE INVENTION

Various examples of the present invention relate to methods for operating wireless communication devices in a wireless communication system, in particular to methods for operating wireless communication devices according to multiple input and multiple output (MIMO) technologies. The present invention relates furthermore to wireless communication devices and a communication system utilizing the methods.

BACKGROUND

Increasing use of mobile voice and data communications may require a more efficient utilization of the available radio frequency resources. Increasing data transmission performance and reliability may be achieved by the so-called multiple input and multiple output (MIMO) technology, which may be used in wireless radio telecommunication systems for transmitting information between the devices, for example between a base station and a user equipment. The user equipment may comprise mobile devices like mobile phones, mobile computers, tablet computers or wearable devices, and stationary devices like personal computers or cash registers. In systems using MIMO technologies the devices may use multiple send and receive antennas. For example, the base station as well as the user equipment may each comprise multiple send and receive antennas. The MIMO technology forms the basis for coding techniques which use the temporal as well as the spatial dimension for transmitting information. The enhanced coding provided in MIMO systems may increase the spectral and energy efficiency of the wireless communication.

The spatial dimension may be used by spatial multiplexing. The spatial multiplexing is a transmission technique in MIMO communications to transmit independent and separately encoded data signals, so-called streams, from each of the multiple transmit antennas or a combination thereof. Therefore, the spatial dimension is reused or multiplexed more than one time.

The so-called full dimensional MIMO (FDMIMO) refers to a technology that arranges the signals transmitted to antennas in the form of beams that are able to power multiple receivers in three dimensions. For example, a base station may comprise a large number of active antenna elements in a two-dimensional grid and the use of the FDMIMO technology enables a support of many spatially separated users on the same time/frequency resource blocks simultaneously. This may reduce interference from overlapping transmissions to other receivers and increases the power of the signal. The beams may form virtual sectors which may be static or dynamic in view of the base station. The large number of antennas of the base station allows radio energy to be spatially focused in transmissions as well as a directional sensitive reception which improves spectral efficiency and radiated energy efficiency. In order to adapt the transmit signal at each individual antenna of the base station in accordance with the currently active receiving user equipment, a base station logic may need information about radio channel properties between the user equipment and the antennas of the base station. Vice versa, in order to adapt the transmit signal at each individual antenna of the user equipment, a user equipment logic may need information about the radio channel properties between the base station and the antennas of the user equipment. For this purpose, a so-called channel sounding may be performed to determine the radio channel properties between the user equipment and the base station. The channel sounding may comprise transmitting predefined signals, for example pilot signals, which may allow the base station and the user equipment to set their configuration antenna parameters for transmitting signals so as to focus radio energy or for receiving radio signals from a certain direction.

When the operational frequency increases and consequently the wavelength decreases, the antenna aperture becomes small and therefore multiple antennas may be utilised to increase the received power. In particular in case of high transmission frequencies of for example 30 GHz or more and multiple antennas having small apertures, the reception sensitivity may significantly depend on polarization of the transmitted radio frequency signals. However, in particular when the user equipment is a movable device, the polarization of the antennas of the user equipment may vary with respect to the antenna arrangement of the base station.

In evolving standards, for example in 3GPP RAN1 Release 15, is defined that the base station broadcasts beam shaped synchronisation signals (so-called SS-bursts). Different SS-bursts targeting different directions are distributed both in time and frequency domain such that each beam is occurring at each sub-band over time. The user equipment may listen for the SS-bursts and may use the received signal to calibrate frequency and timing. The user equipment may scan or adjust its receive beam in order to find the direction that is associated with the strongest SS-burst. However, the polarization of the SS-burst signal may not be optimal for the user equipment depending on the current arrangement of the antennas of the user equipment. For improving the receive beam adjustment of the user equipment, the base station may repeat each SS-burst signal with an orthogonal polarization. However, as the user equipment may receive also SS-burst signals transmitted in other sectors, for example neighbouring sectors or due to reflections, it may be difficult for the user equipment to find the strongest beam and optimize the receive beam polarization.

SUMMARY OF THE INVENTION

In view of the above, there is a need for methods and devices which address at least some of the above shortcomings of conventional MIMO systems. In particular, there is a need for improving operation of devices in a wireless communication system to reduce disturbances and power losses of wireless communications due to polarization misalignments.

According to the present invention, this object is achieved by the features of the independent claims. The dependent claims define embodiments of the invention.

According to the present invention, a method of operating a wireless communication device is provided. The wireless communication device may be operated in a wireless communication system and may have an antenna arrangement configured to adjust the polarization of signals, for example radio frequency signals, to be transmitted via the antenna arrangement. For example, the wireless communication device may comprise a base station or an access point of the wireless communication system. According to the method, at least one first signal is transmitted on a wireless link between the wireless communication device and a further wireless communication device using a first polarization. The further wireless communication device may comprise a user equipment, in particular a mobile terminal device.

Furthermore, on the wireless link, at least one second signal using a second polarization is transmitted, and at least one third signal using a third polarization is transmitted. Based on the at least one first signal, the at least one second signal and the at least one third signal, channels of the wireless link associated with the at least one first signal, the at least one second signal, and the at least one third signal are sounded. The first polarization, the second polarization, and the third polarization are different from each other.

For example, each of the first, second and third polarizations may be a corresponding linear polarization. Thus, a direction of the electric field vector of the first linear polarization, a direction of the electric field vector of the second linear polarization and a direction of the electric field vector of the third linear polarization may be different from each other.

For example, transmitting the signals using the first polarization, the second polarization, and the third polarization may correspond to a polarization beam sweep.

The wireless link may include multiple propagation channels.

In general, to sound the wireless link, reference signals may be transmitted from the wireless communication device (e.g. base station) to the further wireless communication device (e.g. user equipment). Such reference signals may generally have a well-defined symbol sequence and/or transmission power such that based on a receive property of the reference signals it is possible to sound the wireless link. As defined above, the reference signals include the first, second and third signals having different polarizations. The further wireless communication device may feedback information concerning receive characteristics of the received reference signals to the wireless communication device, for example a received signal power. By changing the polarization from one signal to the other signals in small steps, in particular steps which are smaller than 90°, beams where a single polarization is dominant may be identified and reported by the further wireless communication device. A single polarization may be dominant, because of the environment or the polarization properties of the antenna of the further wireless communication device. Thus, polarization and direction of such dominant beams may preferably be used by the wireless communication device for communicating with the further wireless communication device.

The at least one first signal may comprise multiple first signals forming a first angular beam sweep, the at least one second signal may comprise multiple second signals forming a second angular beam sweep, and the at least one third signal may comprise multiple third signals forming a third angular beam sweep. For example, a plurality of spatial sectors may be defined in a cell supported by the wireless communication device. The wireless communication device may perform a first beam sweep covering all or at least some of the plurality of spatial sectors using the multiple first signals having the first polarization. For example, to each of the plurality of spatial sectors a corresponding one of the plurality of first signals may be assigned. When performing the first beam sweep, the wireless communication device may subsequently sent the plurality of first signals to the plurality of assigned spatial sectors, for example using MIMO technologies or beamforming. As an alternative, for performing the first beam sweep, the wireless communication device may broadcast the plurality of first signals to the plurality of assigned spatial sectors contemporaneously. After the first beam sweep has been performed by the wireless communication device, the second beam sweep is performed by the wireless communication device in the same way using the second signals having the second polarization. Consequently, after the second beam sweep has been performed, the third beam sweep may be performed using the third signals having the third polarization. Further beam sweeps may be performed using further signals having further polarizations, for example four beam sweeps or even an excess thereof, for example five to ten beam sweeps.

As will be appreciated, the transmission direction may be altered as part of an inner loop, each inner loop corresponding to a spatial beam sweep and each iterative step along the inner loop corresponding to the change in the transmit direction. Differently, the polarization may be altered as part of an outer loop. For each iterative step along the outer loop, a full inner loop may be implemented. Hence, the spatial beam sweep may be nested with respect to the polarization beam sweep.

Communication of payload data may be performed between the wireless communication device and the further wireless communication device independently from the beam sweep channel sounding, for example using other time and frequency radio resources than the time and frequency radio resources used for the first, second and third signals. For example, between the second angular beam sweep and to the third angular beam sweep, a further signal encoding payload data may be transmitted. The further signal may be transmitted using a further polarization that is selected based on a comparison of the channels sounded based on the at least one first signal and the at least one second signal.

A first angle between the direction of the first polarization and the direction of the second polarization may be essentially equal to a second angle between the direction of the second polarization and the direction of the third polarization. In other words, the polarization angles may be equally distributed. For example, the first polarization may be 0°, the second polarization may be 45° and the third polarization maybe 90° with respect to a common reference, for example a vertical or horizontal reference. "Essentially equal" may include for example that the first angle is in the range of 80% to 120% of the second angle. In the example above, the angle between the second polarization and the third polarization is 45° and therefore the angle between the first polarization and the second polarization may be in the range of 36° to 54°.

In another example, the first polarization may be 0°, the second polarization may be 30°, the third polarization may be 60° and a fourth polarization of a fourth signal transmitted by the wireless communication device and used for channel sounding the channels of the wireless link may be 90°. In this example, an angel spacing between the polarizations equals essentially 30°.

In various examples, each of the at least one first, second and third signals comprises a corresponding unique identifier, for example, each of the at least one first, second and third signals may carry data comprising a corresponding unique identifier. When providing feedback information, the further wireless communication device may identify the received signal by the unique identifier. Thus, sounding the channels of the wireless link may comprise receiving, from the further wireless communication device, the received signal power and the identifier associated to the at least one of the at least one first, second and third signals.

In other examples, to each of the at least one first, second and third signals a corresponding uplink resource is assigned. The uplink resource may relate to a time and frequency radio resource defined in the wireless communication system. For sounding the channels of the wireless link, an indication in the assigned corresponding uplink resource is received from the further wireless communication device. The indication indicates that the further wireless communication device has received the at least one of the at least one first, second and third signals.

For example, sounding the channels of the wireless link may comprise that the wireless communication device receives from the further wireless communication device, information relating to a received signal power associated to at least one of the at least one first, second and third signals in the assigned corresponding uplink resource.

The first signal may comprise a first synchronisation signal, the second signal may comprise a second synchronisation signal, and the third signal may comprise a third synchronisation signal. In particular, the first, second and third signals may comprise shaped synchronisation signals, so-called SS-bursts, or pilot signals for synchronising devices operated in the communication system and for analyzing a communication channel between wireless communication devices operated in the wireless communication system, for example by channel sounding.

In various examples, the first signals, the second signals and the first signals may be broadcasted, for example the first signals, the second signals and the first signals may be transmitted using a broadcast channel.

In further examples, at least two of the first polarization, the second polarization and the third polarization (and, if defined, further polarizations) may be orthogonal to each other. For example, the first polarization may be orthogonal to the third polarization and the second polarization may have a value between the first polarization and the third polarization. Thus, a whole polarization range of linear polarization may be covered.

According to various examples, a further method for operating a wireless communication device is provided. The wireless communication device may be operated in a wireless communication system and may comprise for example a user equipment, in particular a mobile user equipment, like a mobile telephone, a mobile computer, a tablet computer, a wearable device, an Internet-of-Things (IoT) device or a mobile accessory. A wearable device or a mobile accessory may comprise a wearable computer, also known as body born computer or simply wearable, which is a miniature electronic device that may be worn by a user under, with or on top of clothing. According to the method, on a wireless link between the wireless communication device and a further wireless communication device, for example a base station, at least one of at least one first signal, at least one second signal, and at least one third signal is received. For at least one of the at least one first signal, the at least one second signal, and the at least one third signal a corresponding channel sounding information of the wireless link associated with the at least one first signal, the at least one second signal, and the at least one third signal is reported, for example by transmitting one or more corresponding messages, to the further wireless communication device. Based on the channel sounding information, the further wireless communication device may adapt payload data transmissions, for example by configuring an appropriate polarization.

Each of the at least one first, second and third signals may comprise a corresponding unique identifier.

The channel sounding information may comprise at least one of a received signal power, signal-to-noise ration and the identifier associated to the received signal, which may be one of the first, second and third signals. Thus, the unique identifier may contribute to identify the signal for which the channel sounding information is provided by the wireless communication device.

In various examples, to each of the at least one first, second and third signals a corresponding uplink resource is assigned. The sounding information is reported in the assigned corresponding uplink resource. The uplink resource may comprise a time and/or frequency resource defined in the wireless communication system.

For example, the first signal may comprise a first synchronisation signal, the second signal may comprise a second synchronisation signal and the third signal may comprise a third synchronisation signal. In another example, the first signal, the second signal and the third signal may each comprise a pilot signal for channel sounding a communication channel between the further wireless communication device, for example a base station or an access point of the wireless communication system, and the receiving wireless communication device, for example a user equipment.

According to a further aspect, a wireless communication device is provided. The wireless communication device may be operated in a wireless communication system, for example as a base station or an access point. The wireless communication device comprises an antenna arrangement and a logic coupled to the antenna arrangement. The antenna arrangement may be configured to adjust the polarization of a signal to be transmitted via the antenna arrangement. The logic is configured to transmit, via the antenna arrangement on a wireless link between the wireless communication device and a further wireless communication device, at least one first signal using a first polarization, to transmit, on the wireless link, at least one second signal using a second polarization, and to transmit, on the wireless link, at least one third signal using a third polarization. Based on the at least one first signal, the at least one second signal, and the at least one third signal, the logic is furthermore configured to sound channels of the wireless link associated with the at least one first signal, the at least one second signal, and the at least one third signal. The first polarization, the second polarization, and the third polarization are different from each other.

The wireless communication device may be configured to perform the above-described method and the embodiments thereof as the transmitting wireless communication device, for example as a base station.

According to another aspect, a wireless communication device is provided. The wireless communication device may be operated in a wireless communication system, for example as a user equipment. The wireless communication device comprises an antenna arrangement and a logic coupled to the antenna arrangement. The logic is configured to receive via the antenna arrangement, on a wireless link between the wireless communication device and a further wireless communication device, at least one of at least one first signal, at least one second signal, and at least one third signal. The logic is furthermore configured to report to the further wireless communication device, for each received signal of the at least one of the at least one first signal, the at least one second signal, and the at least one third signal a corresponding channel sounding information of the wireless link associated with the at least one first signal, the at least one second signal, and the at least one third signal.

The wireless communication device may be configured to perform the above-described method, for example as a user equipment.

According to a further aspect, a method of operating a wireless communication system is provided. The method comprises transmitting by a wireless communication device of the wireless communication system, on a wireless link between the wireless communication device and a further wireless communication device of the wireless communication system, at least one first signal using a first polarization. The method further comprises transmitting by the wireless communication device, on the wireless link, at least one second signal using a second polarization, and transmitting by the wireless communication device, on the wireless link, at least one third signal using a third polarization. Further, according to the method, at the further wireless communication device, on the wireless link, at least one of the at least one first signal, the at least one second signal, and the at least one third signal is received. By the further wireless communication device, for at least one of the at least one first signal, the at least one second signal, and the at least one third signal a corresponding channel sounding information of the wireless link associated with the at least one first signal, the at least one second signal, and the at least one third signal is transmitted to the wireless communication device. Based on the received channel sounding information, channels of the wireless link associated with the at least one first signal, the at least one second signal, and the at least one third signal are sounded at the wireless communication device. The first polarization, the second polarization, and the third polarization are different from each other.

Further, a wireless communication system is provided comprising the above-described wireless communication devices, for example at least one wireless communication device acting as the transmitting wireless communication device, for example a base station or an access point of the wireless communication system, and at least one wireless communication device acting as the receiving wireless communication device, for example a user equipment. The wireless communication system may be configured to execute the above described method.

Finally, a computer program or a computer program product are provided including program code. The computer program product may comprise a non-transitory memory, e.g. a CD, DVD, disk or Flash-memory on which the program code is stored. The program code may be stored in a memory (e.g. RAM or ROM) and executed by at least one processor or control logic of for example the wireless communication device or the further wireless communication device described above. Executing the program code causes the at least one processor to perform the methods described above.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

Various examples of the present invention will now be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
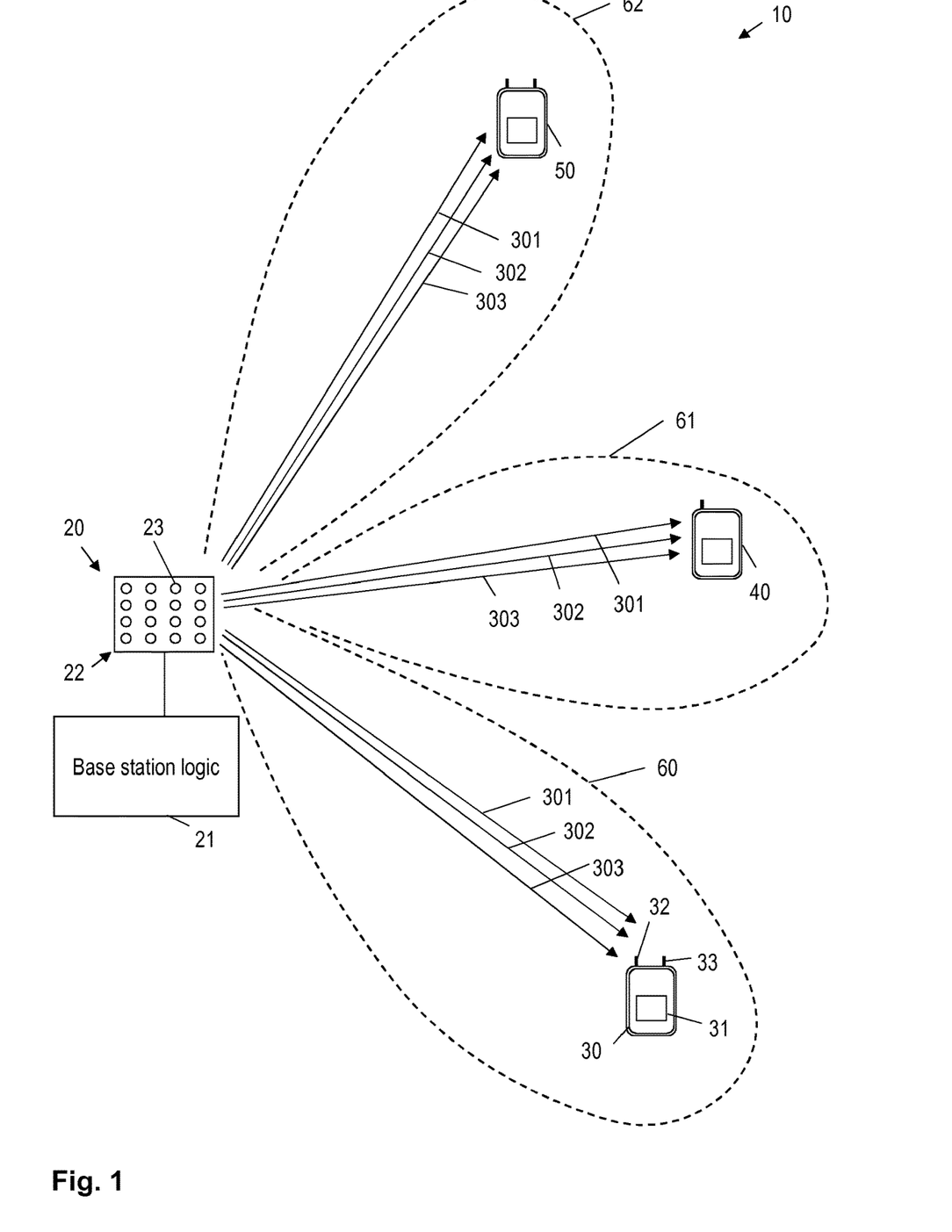
FIG. 1 shows schematically a wireless communication system according to an embodiment of the present invention.

FIG. 1 shows a wireless communication system 10 according to an embodiment. The wireless communication system 10 includes a base station 20 and a plurality of user equipment devices. In FIG. 1, three user equipment devices 30, 40 and 50 are shown. The base station 20 may support a so called multiple input and multiple output (MIMO) technology and therefore the base station 20 may have a large number of antennas, for example several tens or in excess of one hundred antennas.

The base station 20 comprises an antenna arrangement 22 comprising a plurality of antennas which are indicated by circles in FIG. 1. One exemplary antenna of the plurality of antennas is referenced by reference sign 23. The antennas 23 may be arranged in a two-dimensional or three-dimensional antenna array on a carrier. The base station 20 may comprise furthermore associated (not shown) transceivers for the antennas 23. The base station 20 comprises furthermore a base station logic 21. The base station logic 21 is coupled to the antenna arrangement 22 and comprises for example a controller, a computer or a microprocessor on which a computer program may be executed for performing method steps as described below. The computer program may for example be stored in a non-transitory storage medium or similar computer program product. Although in FIG. 1 only one antenna arrangement 22 is shown, the base station 20 may comprise more than one antenna arrangement, for example two, three, four or even more, for example several tens of antenna arrangements, which may cooperate with each other and which may be arranged near to each other or spaced apart.

The antenna arrangement 22 may be configured to transmit signals, for example radio frequency signals, into specific directions, so-called spatial sectors. Three of these sectors are shown in FIG. 1 and indicated by reference signs 60, 61 and 62. The configuration of the sectors 60 to 62 may be static or dynamic. The transmission of radio frequency signals into a specific direction may be achieved by beamforming technologies as it is known in MIMO technologies.

The antenna arrangement 22 may be equipped with dual or multi polarized antennas and may therefore have the capability to transmit and/or receive signals with any polarization, for example a first linear polarization, a second linear polarization and a third linear polarization. For example, the first and third polarizations are orthogonal to each other, and the second polarization may have a polarization angle between the first and the third polarizations of, for example 45° with respect to the first polarization. In other examples, the antenna arrangement 22 may be capable of transmitting and are receiving signals in four different polarizations, having for example polarization angles of 0°, 30°, 60° and 90° with respect to a geographical reference, for example a horizontal reference.

In the communication system 10, as shown in FIG. 1, a plurality of user equipment devices like mobile phones, mobile and stationary computers, tablet computers, smart wearable devices or smart mobile devices may be arranged. Three exemplary user equipment devices 30, 40 and 50 are shown in FIG. 1. Each of the user equipment devices 30, 40 and 50 may be configured to communicate with the base station 20.

In the following, the user equipment 30 will be described in more detail. However, the user equipment 40 or the user equipment 50 may comprise similar features as the user equipment 30 and may therefore act similarly. The user equipment 30 comprises one or more antennas. In the exemplary embodiment shown in FIG. 1, the user equipment 30 comprises two antennas 32 and 33. For example, the antennas 32, 33 may each comprise an antenna panel or an antenna array, or the antennas 32, 33 may be formed by an antenna array comprising a plurality of antennas. Furthermore, the user equipment 30 comprises a logic 31. The logic 31 may comprise for example a controller or microprocessor on which a computer program may be executed for performing method steps as described below. The computer program may for example be stored in a non-transitory storage medium or similar computer program product. The user equipment 30 may comprise more components, for example a graphical user interphase and a battery, but these components are not shown in FIG. 1 for clarity reasons. The antennas 32, 33 of the user equipment 30 may be arranged spaced apart from each other, for example, the two antennas 32 and 33 may be arranged at a top side of the user equipment near the edges. As an alternative, one or more antennas may be arranged at the top side and some other antennas may be arranged at a bottom side of the user equipment 30.

The above described setup may, for example, be used advantageously in the following scenarios. For example, one wireless communication device, e.g. the base station 20 or an access point, may be capable of communicating on arbitrary polarization. The other wireless communication device, e.g. the user equipment 30, may be limited to a single polarization. Furthermore, at least one of the devices may be mobile. Further, uplink and downlink antennas/antenna panels may not be the same, such that reciprocity may not apply, or the number of uplink vs. downlink links is different.

Operation of the base station 20 in connection with the user equipment devices 30, 40 and 50 will be described in more detail in connection with FIGS. 2-5. Although in FIGS. 2-5, reference will mainly be made to user equipment 30, the same operational steps may be performed when operating the base station 20 in connection with the user equipment 40 or the user equipment 50.

Figure 2:
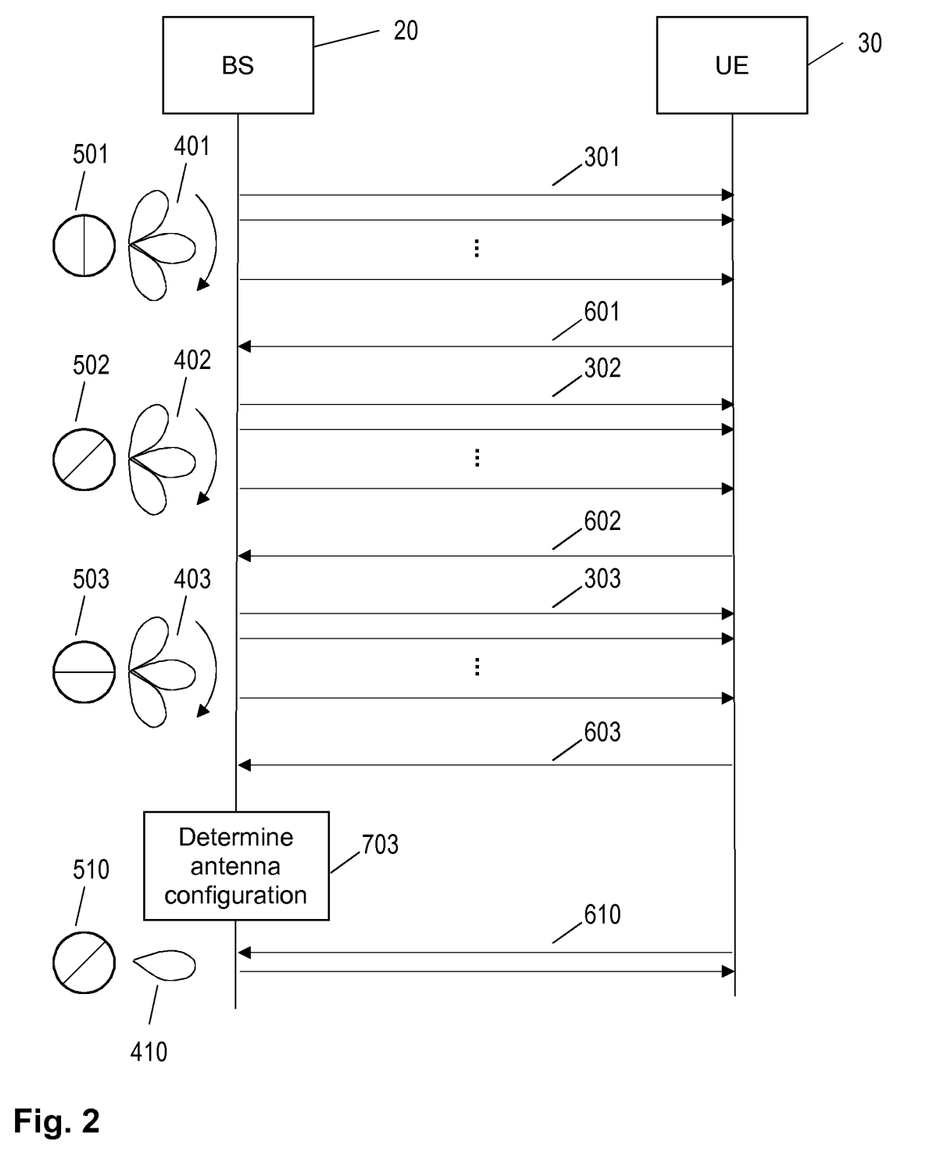
FIG. 2 shows a flowchart illustrating a communication between a base station and a user equipment according to embodiments of the present invention.

FIG. 2 shows a flowchart of an exemplary signaling between the base station BS 20 and the user equipment UE 30. In a first beam sweep 401, a plurality of first downlink signals 301 is transmitted by the base station 20 with a first polarization 501. The downlink signals 301 may comprise for example pilot signals or synchronization signals. As illustrated in FIG. 1, the first beam sweep 401 may comprise for example transmitting a downlink signal 301 with the first polarization 501 in the direction of sector 60, transmitting a downlink signal 301 with the first polarization 501 in the direction of sector 61, and transmitting a downlink signal 301 with the first polarization 501 in the direction of sector 62. The downlink signals 301 may be transmitted subsequently in the direction of sectors 60 to 62 or may be broadcasted contemporaneously or transmitted at least partly contemporaneously using a spatial multiplexing, for example using MIMO technologies.

Each of the first downlink signals 301 may comprise a unique identifier.

The user equipment 30 may receive at least one or some of the first downlink signals 301 of the first beam sweep 401. For example, the user equipment 30 may determine for each received first downlink signal 301 a corresponding received power. The received power may depend on channel characteristics of the wireless link between the base station 20 and the user equipment 30. Furthermore, the received power may depend on the first polarization 501. For example, the antennas 32 and 33 of the user equipment 30 may be more sensitive in some polarizations than in others. Based on the received first downlink signals 301, the user equipment 30 may report a corresponding channel sounding information 601 to the base station 20. For example, the channel sounding information may be reported in a separate message and the channel sounding information may comprise for example the received power and the identifier for each of the received first downlink signals 301. Additionally or as an alternative, the channel sounding information may comprise a signal-to-noise ratio determined by the user equipment 30 for each of the received first downlink signals 301. In another example, to each of the first downlink signal 301 a corresponding uplink resource may be assigned and the sounding information is reported in the assigned corresponding uplink resource. The uplink resource may be assigned to a time and frequency radio resource defined in the wireless communication system.

As further shown in FIG. 2, a second beam sweep 402 may be performed by the base station 20. In the second beam sweep 402, a plurality of second downlink signals 302 is transmitted by the base station 20 with a second polarization 502. As can be seen from FIG. 1, the second beam sweep 402 may comprise directional transmissions 302 in each sector 60 to 62. As described above in connection with the first beam sweep 401, the user equipment 30 may receive at least one or some of the second downlink signals 302 of the second beam sweep 402 and may report a corresponding channel sounding information 602 relating to the second downlink signals 302. The second beam sweep 402 may differ from the first beam sweep 401 essentially in that the second polarization 502 is different from the first polarization 501. As indicated in FIG. 2, the first polarization 501 may be a vertical polarization and the second polarization 502 may have a polarization inclined by 45° with respect to the first polarization 501.

As further shown in FIG. 2, a third beam sweep 403 may be performed by the base station 20. In the third beam sweep 402, a plurality of third downlink signals 303 is transmitted by the base station 20 with a third polarization 503. As shown in FIG. 1, the third beam sweep 403 may comprise directional transmissions 303 in each sector 60 to 62. As described above in connection with the first and second beam sweeps 401 and 402, the user equipment 30 may receive at least one or some of the third downlink signals 303 of the third beam sweep 403 and may report the corresponding channel sounding information 603 relating to the third downlink signals 303. The third beam sweep 402 may differ from the first beam sweep 401 and the second beam sweep 402 essentially in that the third polarization 503 is different from the first and second polarizations 501 and 502. As indicated in FIG. 2, the third polarization 503 may be a horizontal polarization, thus having a polarization inclined by 45° with respect to the second polarization 502 and being orthogonal to the first polarization 501.

The first, second and third signals 301, 302, 303 may be separated from each other by using a time division multiple access technology (TDMA) and may therefore be transmitted one after the other. As an alternative, the first and second signals 301, 302 may be separated from each other by using a frequency division multiple access technology (FDMA) or a code division multiple access technology (CDMA). When using FDMA or CDMA, the first, second and third signals 301, 302, 303 may be transmitted at the same time.

The first, second and third signals may be identical signals apart from the polarization. As an alternative, the first, second and third signals may comprise at least partially identical information, for example synchronization information or channel sounding (pilot) information, but different unique identifiers.

At 703, the base station 20 determines, based on the channel sounding information reported in 601, 602 and 603, an antenna configuration for communicating payload data between the base station 20 and the user equipment 30. In other words, based on the first, second and third downlink signals, the base station 20 performs a channel sounding of the wireless link associated with the first, second and third downlink signals. For example, the base station 20 may determine for which of the first, second and third downlink signals a highest received power was reported by the user equipment 30, and may configure the antenna arrangement 22 such that payload communication with the user equipment 20 is performed using a directionality 410 and polarization 510 of the downlink signal which effected the highest received power. Using this antenna configuration, payload data 610 may be communicated between the base station 20 and the user equipment 30.

Figure 3:
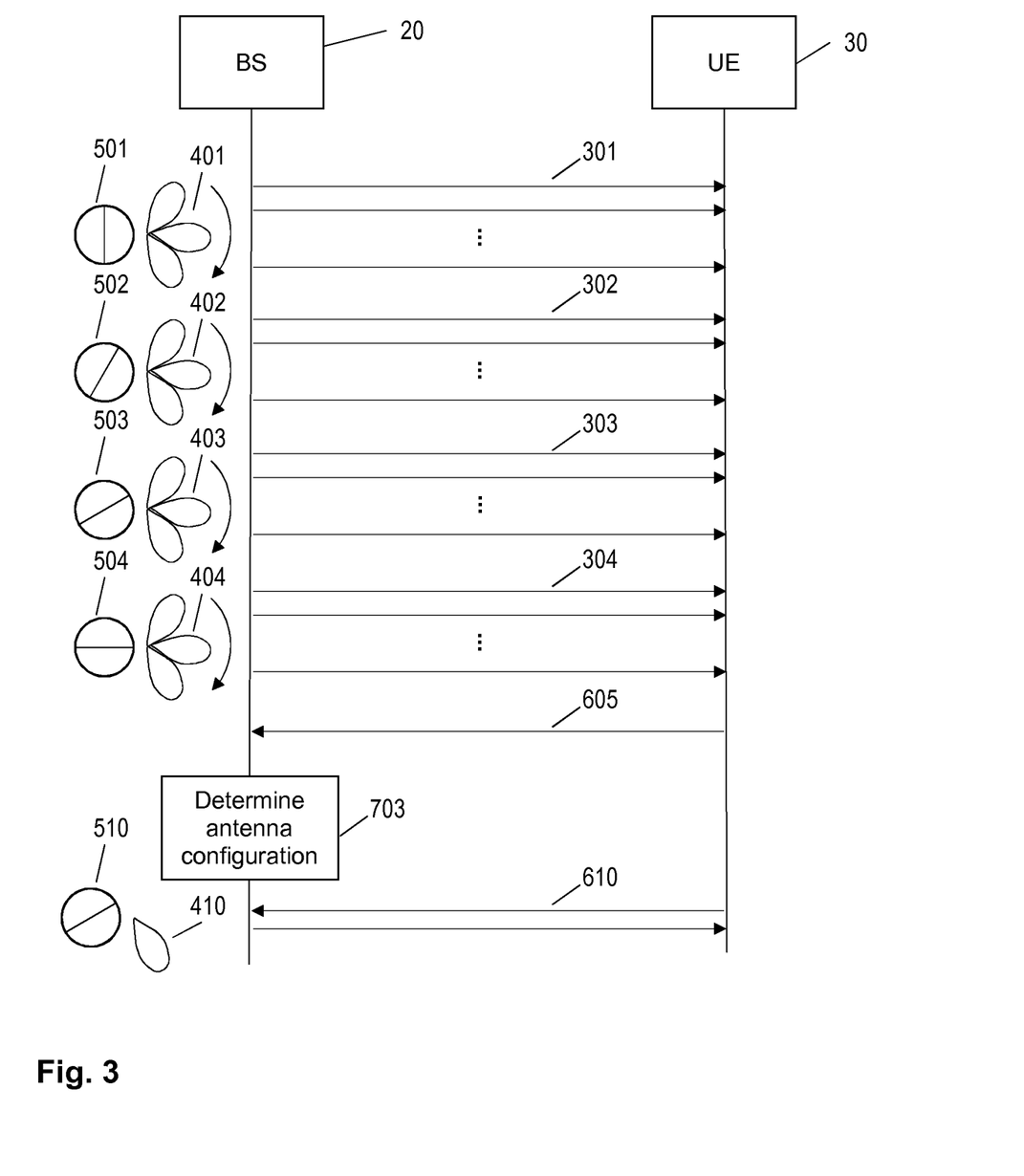
FIG. 3 shows a flowchart illustrating a communication between a base station and a user equipment according to further embodiments of the present invention.

FIG. 3 shows a further flowchart of a further exemplary signaling between the base station 20 and the user equipment 30. Compared to the signaling described in connection with FIG. 2, in this example in each sector four beam sweeps 401 to 404 comprising downlink signals 301 to 304 are performed and the user equipment 30 reports the channel sounding information not for the each of the beam sweeps immediately after the beam sweep, but in an aggregated manner at the end of the fourth beam sweep 404.

In detail, a first beam sweep 401 comprising a plurality of first downlink signals 301 is transmitted by the base station 20 with the first polarization 501. As shown in FIG. 1, the first beam sweep 401 may comprise for example transmitting a downlink signal 301 with the first polarization 501 in the direction of sector 60, transmitting a downlink signal 301 with the first polarization 501 in the direction of sector 61, and transmitting a downlink signal 301 with the first polarization 501 in the direction of sector 62. The downlink signals 301 may be transmitted into sectors 60 to 62 using spatial multiplexing, for example using MIMO technologies. A second beam sweep 402 comprising a plurality of second downlink signals 302 is performed to cover sectors 60 to 62 using a second polarization 502. Subsequently, a third beam sweep 403 comprising a plurality of third downlink signals 303 is performed using a third polarization 503, and a fourth beam sweep 404 comprising a plurality of fourth downlink signals 304 is performed using a fourth polarization 504. Essentially, the four beam sweeps 401 to 404 differ in the used polarizations 501 to 504. As an example shown in FIG. 3, the polarization changes from polarization 501 to polarization 504 are essentially equal, in particular 30°, such that the first polarization 501 is a vertical polarization, the second polarization 502 is turned 30° to the right with respect to the first polarization 501, the second polarization is turned 60° to the right with respect to the first polarization 501, and the fourth polarization 504 is orthogonal (90°) to the first polarization 501.

Each of the first, second, third and fourth downlink signals 301 two 304 may comprise a unique identifier.

The user equipment 30 may receive at least some of the first, second, third and fourth downlink signals 301 to 304 of the first, second, third and fourth beam sweeps 401 to 404. For example, the user equipment 30 may determine for each received downlink signal 301 to 304 a corresponding received power. The received power may depend on channel characteristics of the wireless link between the base station 20 and the user equipment 30. Furthermore, the received power may depend on the polarizations 501 to 504. Based on the received first, second, third and fourth downlink signals 301 to 304, the user equipment 30 may report a corresponding channel sounding information 605 to the base station 20. For example, the channel sounding information may be reported in a separate message and the channel sounding information may comprise for example the received powers and identifiers for each of the downlink signals 301 to 304. Additionally or as an alternative, the channel sounding information may comprise signal-to-noise ratios determined by the user equipment 30 for each of the received downlink signals 301 to 304. In another example, the channel sounding information comprises for example a list of pairs each including a received power and an identifier. The list may including only a predefined number of pairs comprising those with the highest received power values, for example a list of the best five or ten pairs.

At 703, the base station 20 may determine, based on the channel sounding information reported in 605, an antenna configuration for communicating payload data between the base station 20 and the user equipment 30. For example, based on the list of pairs of received power and identifier, the base station 20 may select the best pair and may configure the antenna arrangement 22 such that payload communication 610 with the user equipment 20 is performed using the directionality 410 and polarization 510 associated to the downlink signal identified by the identifier of the best pair. The base station 20 may communicate payload 610 with the user equipment 30 using this antenna configuration.

The base station may store the received list of pairs, for example in a volatile memory of the base station logic 21. In case of a communication in error, for example due to a degraded communication using the configured directionality 410 and polarization 510, the base station 20 may select the second best pair from the list received from the user equipment 30 and may configure the antenna arrangement 22 such that payload communication with the user equipment 20 is performed using the directionality and polarization associated to the downlink signal identified by the identifier of the second best pair. Thus, the reconfiguration of the antenna arrangement may be performed without additional channel sounding, such that communication reliability may be increased. However, the above described sounding procedure may be repeated in regular intervals or triggered upon degraded signal transmissions such that the list of pairs may be updated.

Figure 4:
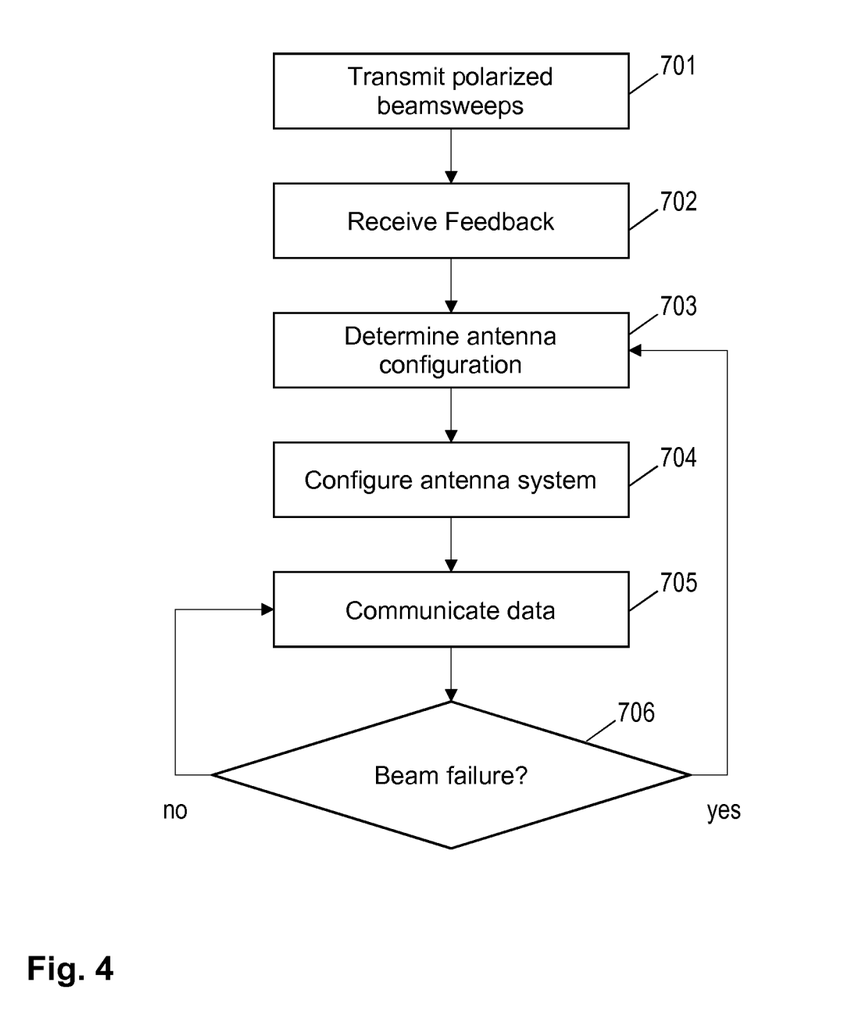
FIG. 4 shows schematically method steps performed by a base station according to an embodiment of the present invention.

FIG. 4 shows method steps performed by the base station in detail. In step 701, the base station 20 may transmit polarized beam sweeps, for example the beam sweeps 401 to 404. For example, in a first spatial sector 60 a plurality of signals may be sent, each having a different polarization. Then, in a second spatial sector 61, a plurality of signals may be sent, each having a different polarization. This may be continued for each spatial sector to cover a cell supported by the base station. As an alternative, beam sweeps may be performed to cover some more all sectors 60 to 62 of a cell supported by the base station 20, wherein each of the beam sweeps is performed using a different polarization. The different polarizations may be selected such that the polarization angles have same angular offsets, for example if n polarization angles are to be used, an offset between the polarization angles may be selected to 90°/(n−1). For example, if four beam sweeps with different polarization angles are to be performed, the polarization angles may be selected to 0°, 30°, 60° and 90°.

In step 702, the base station 20 may receive feedback from the user equipment devices in the wireless communication system. Each user equipment device may report for each received signal a corresponding received signal power. Furthermore, each user equipment device may report for each received signal further parameters which may be relevant for sounding the channel of the wireless link between the base station 20 and the corresponding user equipment, for example a signal-to-noise ratio. For identifying the received signals, each signal may comprise an identifier which is comprised in the feedback information from the user equipment to the base station 20.

In step 703, the base station 20 may determine for each user equipment an antenna configuration for communicating data with the corresponding user equipment, for example payload data and control data. For example, the user equipment may select the spatial sector and polarization which resulted in the highest received signal power or best signal-to-noise ratio or a combination thereof. The such determined antenna configuration is used it to configure the antenna arrangement 22 of the base station 20 when communicating with the corresponding user equipment.

In step 705, data is communicated with the user equipment using the antenna configuration configured in step 704. The data may comprise control and/or payload information.

In step 706, beam failures may be detected. For example, the user equipment may report a degraded receive quality, or the base station may determine a beam failure due to frequent retransmission requests from the user equipment. If no beam failures are detected or the number of beam failures within a certain time interval is below a threshold value, further data may be communicated in step 705. In case of beam failures, the base station 20 may determine in step 703 another antenna configuration for communicating with the corresponding user equipment. For example, as described above, the user equipment may have reported a list of pairs of received power and identifier. The base station 20 may select another one of this pairs, for example a second or third best of the pairs and may communicate with this configuration in step 705.

Figure 5:
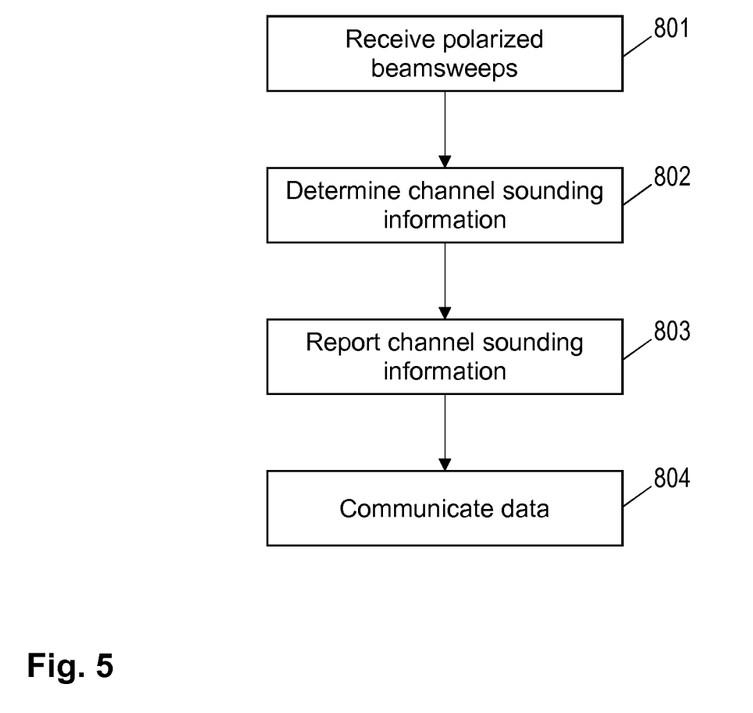
FIG. 5 shows schematically method steps performed by a user equipment according to an embodiment of the present invention.

FIG. 5 shows method steps performed by each of the user equipment devices 30, 40, 50 in detail. In step 801, the user equipment 30, 40, 50 receives signals of polarized beam sweeps transmitted by the base station 20 in the step 701. For each received signal, the user equipment 30, 40, 50 may determine in step 802 a corresponding channel sounding information. For example, the user equipment 30, 40, 50 may determine a received signal power and/or a signal-to-noise ratio. In step 803 the user equipment 30, 40, 50 may report the channel sounding information to the base station 20. For example, after each received signal, the user equipment 30, 40, 50 may report the corresponding channel sounding information, for example in a specific message or in a particular radio resource assigned to the received signal. Additionally or as an alternative, the user equipment 30, 40, 50 may collect a plurality of channel sounding information determined for a plurality of received signals and may transmit a list comprising the collected channel sounding information to the base station 20. Each signal may comprise an identifier uniquely identifying the signal, and the user equipment 30 may report the channel sounding information in connection with the identifier such that the base station 20 is enabled to assign the channel sounding information to the signals transmitted by the base station 20. As described above, the base station 20 may configure its antenna system based on the reported channel sounding information and may communicate data with the user equipment 30, 40, 50 in step 804.

To sum up, the base station 20 is capable of using more than two polarization angles such that the polarization may be changed in smaller steps than 90°. Beam sweeps using at least three different polarization angles are performed by the base station 20 for sounding the channel of the wireless link between the base station and the user equipment devices 30, 40, 50 in the coverage of the base station 20. Each user equipment 30, 40, 50 reports the channels it sees for each channel independently. This may ensure that beams where a single polarization is dominant, caused by either the environment or the polarization properties of the user equipment antenna 32, 33, are identified and reported by the user equipment 30, 40, 50.

Due to the optimization of the polarization of the transmitted signals, communication quality may be enhanced such that a higher signal-to-noise ratio may be achieved even at lower power levels. Therefore, the above-described methods may be in particular advantageous in connection with very high frequencies, for example above 30 GHz, in particular for example at 80 GHz, which may lead to the use of array antennas and increased directivity. Which in turn makes it important to select the optimal beam for whatever polarization.

The invention claimed is:

1. A method of operating a wireless communication device, the method comprising:
    transmitting, on a wireless link between the wireless communication device and a further wireless communication device, at least one first signal using a first polarization,
    transmitting, on the wireless link, at least one second signal using a second polarization,
    transmitting, on the wireless link, at least one third signal using a third polarization, wherein each one of the at least one first signal, the at least one second signal, and the at least one third signal carries data comprising a corresponding unique identifier, and
    sounding, based on the at least one first signal, the at least one second signal, and the at least one third signal, channels of the wireless link associated with the at least one first signal, the at least one second signal, and the at least one third signal, wherein sounding the channels of the wireless link includes receiving, from the further wireless communication device, the identifier and a received signal power associated to at least one of the at least one first, second, and third signals, wherein the first polarization, the second polarization, and the third polarization are different from each other.

2. The method of claim 1,
wherein the at least one first signal comprises multiple first signals forming a first angular beam sweep,
wherein the at least one second signal comprises multiple second signals forming a second angular beam sweep, and
wherein the at least one third signal comprises multiple third signals forming a third angular beam sweep.

3. The method of claim 1,
wherein a first angle between the direction of the first polarization and the direction of the second polarization is in the range of 80% to 120% of a second angle between the direction of the second polarization and the direction of the third polarization.

4. The method of claim 1, wherein to each of the at least one first, second and third signals a corresponding uplink resource is assigned, wherein sounding the channels of the wireless link comprises:
receiving, from the further wireless communication device, an indication in the assigned corresponding uplink resource indicating that the further wireless communication device received at least one of the at least one first, second and third signals.

5. The method of claim 1, wherein a corresponding uplink resource is assigned to each one of the at least one first signal, the at least one second signal, and the at least one third signal, wherein sounding the channels of the wireless link comprises:
receiving, from the further wireless communication device, the received signal power associated to at least one of the at least one first, second and third signals in the assigned corresponding uplink resource.

6. The method of claim 1, wherein the at least one first signal comprises a first synchronization signal, the at least one second signal comprises a second synchronization signal, and the at least one third signal comprises a third synchronization signal.

7. The method of claim 1, wherein the at least one first signal comprises a first pilot signal, the at least one second signal comprises a second pilot signal, and at least one the third signal comprises a third pilot signal.

8. The method of claim 1, wherein at least one of the at least one first signal, the at least one second signal and the at least one third signal is broadcasted.

9. The method of claim 1, wherein at least two of the first polarization, the second polarization and the third polarization are orthogonal to each other.

10. A method of operating a wireless communication device, the method comprising:
transmitting, on a wireless link between the wireless communication device and a further wireless communication device, at least one first signal using a first polarization,
transmitting, on the wireless link, at least one second signal using a second polarization,
transmitting, on the wireless link, at least one third signal using a third polarization,
transmitting, on the wireless link, at least one fourth signal using a fourth polarization, and
sounding, based on the at least one first signal, the at least one second signal, the at least one third signal, and the at least one fourth signal, channels of the wireless link associated with the at least one first signal, the at least one second signal, the at least one third signal, and the at least one fourth signal,
wherein a first angle between the direction of the first polarization and the direction of the second polarization, a second angle between the direction of the second polarization and the direction of the third polarization, and a third angle between the direction of the third polarization and a direction of the fourth polarization are all equal.

11. The method of claim 10, wherein the first, second and third angles are each 30°.

12. A method of operating a wireless communication device, the method comprising:
receiving, on a wireless link between the wireless communication device and a further wireless communication device, at least one of at least one first signal having a first polarization, at least one second signal having a second polarization, and at least one third signal having a third polarization, wherein each of the at least one first, second and third signals comprises a corresponding unique identifier, and
transmitting to the further wireless communication device, for at least one of the at least one first signal, the at least one second signal, and the at least one third signal, a corresponding channel sounding information of the wireless link associated with the at least one first signal, the at least one second signal, and the at least one third signal, wherein the channel sounding information comprises at least one of a received signal power and the identifier associated to the received signal.

13. The method of claim 12, wherein to each of the at least one first, second and third signals a corresponding uplink resource is assigned, wherein the sounding information is reported in the assigned corresponding uplink resource.

* * * * *